(12) United States Patent
Papasakellariou et al.

(10) Patent No.: US 9,986,539 B2
(45) Date of Patent: *May 29, 2018

(54) MULTIPLEXING CONTROL AND DATA INFORMATION FROM A USER EQUIPMENT IN MIMO TRANSMISSION MODE

(71) Applicant: Samsung Electronics Co., Ltd., Gyeonggi-do (KR)

(72) Inventors: Aris Papasakellariou, Houston, TX (US); Young-Bum Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/713,832

(22) Filed: May 15, 2015

(65) Prior Publication Data

US 2015/0249984 A1    Sep. 3, 2015

Related U.S. Application Data

(63) Continuation of application No. 14/074,327, filed on Nov. 7, 2013, now Pat. No. 9,036,739, which is a
(Continued)

(51) Int. Cl.
*H04W 72/04* (2009.01)
*H04L 1/16* (2006.01)
(Continued)

(52) U.S. Cl.
CPC ...... *H04W 72/0413* (2013.01); *H04B 7/0413* (2013.01); *H04L 1/003* (2013.01);
(Continued)

(58) Field of Classification Search
None
See application file for complete search history.

(56) References Cited

U.S. PATENT DOCUMENTS 7,657,815 B2    2/2010  Seidel et al.
8,625,554 B2 *  1/2014  Zhang .................. H04L 1/1861
                                                    370/338
(Continued)

FOREIGN PATENT DOCUMENTS

CA      2 467 497      6/2003
CN      101379752      3/2009
(Continued)

OTHER PUBLICATIONS

Russian Office Action dated Sep. 25, 2015 issued in counterpart application No. 2014123522/08, 19 pages.
(Continued)

*Primary Examiner* — Bunjob Jaroenchonwanit
(74) *Attorney, Agent, or Firm* — The Farrell Law Firm, P.C.

(57) ABSTRACT

A method and apparatus are provided for transmitting UCI through a PUSCH. The method includes coding data bits and UCI bits, respectively; multiplexing the coded data bits and the coded UCI bits; and transmitting the multiplexed bits. The PUSCH includes two TBs, and a number of coded modulation symbols per layer of the UCI is determined based on a value related to a number of bits in at least one code block of a first TB, a number of Single-Carrier Frequency Division Multiple Access symbols of the first TB, scheduled bandwidth for the first TB, a value related to a number of bits in at least one code block of a second TB, a number of Single-Carrier Frequency Division Multiple Access symbols of the second TB, scheduled bandwidth for the second TB, a number of bits of the UCI, and an offset of the PUSCH.

24 Claims, 10 Drawing Sheets

Related U.S. Application Data continuation of application No. 13/155,910, filed on Jun. 8, 2011, now Pat. No. 8,605,810.

(60) Provisional application No. 61/352,631, filed on Jun. 8, 2010, provisional application No. 61/408,293, filed on Oct. 29, 2010.

(51) Int. Cl.
| | |
|---|---|
| *H04L 1/18* | (2006.01) |
| *H04L 5/00* | (2006.01) |
| *H04B 7/0413* | (2017.01) |
| *H04W 28/04* | (2009.01) |
| *H04B 7/0452* | (2017.01) |
| *H04L 1/00* | (2006.01) |

(52) U.S. Cl.
CPC .......... *H04L 1/0072* (2013.01); *H04L 1/1671* (2013.01); *H04L 1/1812* (2013.01); *H04L 1/1861* (2013.01); *H04L 5/0037* (2013.01); *H04W 28/04* (2013.01); *H04W 72/042* (2013.01); *H04B 7/0452* (2013.01); *H04L 1/001* (2013.01); *H04L 1/0004* (2013.01)

(56) References Cited

U.S. PATENT DOCUMENTS

| | | | |
|---|---|---|---|
| 2004/0199814 A1 | 10/2004 | Kim et al. | |
| 2006/0195767 A1 | 8/2006 | Ihm et al. | |
| 2007/0106924 A1 | 5/2007 | Seidel et al. | |
| 2008/0069015 A1 | 3/2008 | Walton et al. | |
| 2008/0153425 A1 | 6/2008 | Heo et al. | |
| 2009/0034507 A1 | 2/2009 | Chang et al. | |
| 2009/0129259 A1 | 5/2009 | Malladi et al. | |
| 2009/0201825 A1 | 8/2009 | Shen et al. | |
| 2011/0268045 A1* | 11/2011 | Heo ...................... | H04L 1/0027 370/329 |
| 2011/0268080 A1* | 11/2011 | Luo ...................... | H04L 5/0053 370/330 |
| 2011/0274059 A1* | 11/2011 | Brown ................ | H04L 27/0008 370/329 |
| 2011/0299484 A1* | 12/2011 | Nam ..................... | H04L 1/0025 370/329 |
| 2012/0063405 A1 | 3/2012 | Han et al. | |
| 2012/0093117 A1 | 4/2012 | Suzuki et al. | |
| 2012/0113831 A1* | 5/2012 | Pelletier ................ | H04L 5/0058 370/252 |
| 2012/0243511 A1 | 9/2012 | Lv et al. | |
| 2012/0327884 A1 | 12/2012 | Seo et al. | |
| 2013/0028203 A1* | 1/2013 | Hooli ................... | H04L 1/0026 370/329 |
| 2013/0235825 A1 | 9/2013 | Walton et al. | |
| 2014/0071965 A1 | 3/2014 | Terry et al. | |
| 2014/0362833 A1* | 12/2014 | Terry .................... | H04L 1/1607 370/336 |
| 2015/0249962 A1 | 9/2015 | Suzuki et al. | |
| 2016/0021653 A1* | 1/2016 | Papasakellariou .. | H04W 36/385 370/329 |
| 2016/0226636 A1* | 8/2016 | Seo ....................... | H04L 1/0026 |

FOREIGN PATENT DOCUMENTS

| | | |
|---|---|---|
| CN | 101636955 | 1/2010 |
| EP | 2 034 773 | 3/2009 |
| EP | 2 086 145 | 8/2009 |
| JP | 2008-526090 | 7/2008 |
| JP | 2010-087634 | 4/2010 |
| JP | 2013-513323 | 4/2013 |
| JP | 2013-530563 | 7/2013 |
| JP | 2013-531407 | 8/2013 |
| JP | 5395902 | 10/2013 |
| KR | 1020080091250 | 10/2008 |
| RU | 2 313 908 | 9/2004 |
| RU | 2 329 604 | 7/2008 |
| RU | 2 330 381 | 7/2008 |
| RU | 2 364 036 | 8/2009 |
| WO | WO 2008/132599 | 11/2008 |
| WO | WO 2009/157632 | 12/2009 |
| WO | WO 2011/069436 | 6/2011 |
| WO | WO 2011/140109 | 11/2011 |

OTHER PUBLICATIONS

Qualcomm Incorporated, "UCI Multiplexing for SU-MIMO Transmission", R1-102762, 3GPP TSG-RAN WG1 #61, May 14, 2010.
Samsung, "Further Discussion on Data and Control Multiplexing in UL MIMO Transmissions", R1-103675, 3GPP TSG RAN WG1 #61bis, Jul. 2, 2010.
Samsung, "Further Discussion on Data and Control Multiplexing in UL MIMO Transmissions", R1-104614, 3GPP TSG RAN WG1 #62, Aug. 27, 2010.
Chinese Office Action dated Dec. 2, 2014 issued in counterpart application No. 201180038389.3.
Japanese Office Action dated Dec. 19, 2014 issued in counterpart application No. 2013-255164.
Freescale Semiconductor, White Paper, "Long Term Evolution Protocol Overview", Oct. 2008.
Japanese Office Action dated Jul. 25, 2016 issued in counterpart application No. 2015-185352, 8 pages.
Fujitsu, "Codeword to Layer Mappping for Multiple Layers MIMO Systems", R1-103223, 3GPP TSG-RAN1 #61, May 10-14, 2010, 6 pages.
Japanese Office Action dated Dec. 25, 2017 issued in counterpart application No. 2017-085854, 6 pages.
LGE, NSN, Nokia, "Correction of Control MCS Offset and SRS Symbol Puncturing", R1-084183, 3GPP TSG-RAN1 Meeting #55, Nov. 10-14, 2008, 7 pages.
Huawei, "Analysis of Multiplexing Schemes of Control and Data in Multi-Layer PUSCH Transmission", R1-101967, 3GPP TSG RAN WG1 Meeting #60-bis, Apr. 12-16, 2010, 6 pages.
European Search Report dated Jan. 10, 2017 issued in counterpart application No. 11169136.6-1874, 12 pages.
Korean Office Action dated Jan. 30, 2018 issued in counterpart application No. 10-2012-7032208, 6 pages.

* cited by examiner

US 9,986,539 B2

MULTIPLEXING CONTROL AND DATA INFORMATION FROM A USER EQUIPMENT IN MIMO TRANSMISSION MODE

PRIORITY

This application is a Continuation application of U.S. application Ser. No. 14/074,327, which was filed in the U.S. Patent and Trademark Office on Nov. 7, 2013, which is a Continuation application of U.S. application Ser. No. 13/155,910, which was filed in the U.S. Patent and Trademark Office on Jun. 8, 2011, and issued as U.S. Pat. No. 8,605,810 on Dec. 10, 2013, and claims priority under 35 U.S.C. § 119(e) to U.S. Provisional Application Nos. 61/352,631 and 61/408,293, which were filed in the U.S. Patent and Trademark Office on Jun. 8, 2010, and Oct. 29, 2010, respectively, the content of each of which is incorporated herein by reference.

BACKGROUND OF THE INVENTION

1. Field of the Invention

The present invention relates generally to wireless communication systems and, more specifically, to the multiplexing of control information and data information in a physical channel transmitted in the uplink of a communication system.

2. Description of the Art

A communication system includes a DownLink (DL) that conveys transmission of signals from a Base Station (BS or Node B) to User Equipment (UEs) and an UpLink (UL) that conveys transmission of signals from UEs to a Node B. A UE, also commonly referred to as a terminal or a mobile station, may be fixed or mobile and may be a wireless device, cellular phone, personal computer device, and the like. A Node B is generally a fixed station and may also be referred to as a Base Transceiver System (BTS), an access point, or the like.

The UL supports the transmission of data signals carrying information content, control signals providing information associated with the transmission of data signals in the DL, and Reference Signals (RSs), which are commonly referred to as pilot signals. The DL also supports the transmission of data signals, control signals, and RSs.

DL data signals are conveyed through a Physical Downlink Shared CHannel (PDSCH). UL data signals are conveyed through a Physical Uplink Shared CHannel (PUSCH).

DL control signals may be broadcast or sent in a UE-specific nature. Accordingly, UE-specific control signals can be used, among other purposes, to provide UEs with Scheduling Assignments (SAs) for PDSCH reception (DL SAs) or PUSCH transmission (UL SAs). The SAs are transmitted from Node B to respective UEs using Downlink Control Information (DCI) formats through respective Physical Downlink Control CHannels (PDCCHs).

In the absence of a PUSCH transmission, a UE conveys Uplink Control Information (UCI) through a Physical Uplink Control CHannel (PUCCH). However, when it has a PUSCH transmission, the UE may convey UCI together with data information through the PUSCH.

The UCI includes ACKnowledgment (ACK) information associated with the use of a Hybrid Automatic Repeat reQuest (HARQ) process. The HARQ-ACK information is sent in response to the reception of Transport Blocks (TBs) by the UE conveyed by the PDSCH.

The UCI may also include a Channel Quality Indicator (CQI), or a Precoding Matrix Indicator (PMI), or a Rank Indicator (RI), which may be jointly referred to as Channel State Information (CSI). The CQI provides Node B with a measure of the Signal to Interference and Noise Ratio (SINR) the UE experiences over sub-bands or over the whole operating DL BandWidth (BW). This measure is typically in the form of the highest Modulation and Coding Scheme (MCS) for which a predetermined BLock Error Rate (BLER) can be achieved for the transmission of TBs. The MCS represents the product of the modulation order (number of data bits per modulation symbol) and of the coding rate applied to the transmission of data information. The PMI/RI informs Node B how to combine the signal transmission to the UE from multiple Node B antennas using the Multiple-Input Multiple-Output (MIMO) principle.

FIG. 1 illustrates a conventional PUSCH transmission structure. For simplicity, the Transmission Time Interval (TTI) is one sub-frame 110 which includes two slots. Each slot 120 includes $N_{symb}^{UL}$ symbols used for the transmission of data signals, UCI signals, or RSs. Each symbol 130 includes a Cyclic Prefix (CP) to mitigate interference due to channel propagation effects. The PUSCH transmission in one slot may be either at a same or different BW as the PUSCH transmission in the other slot. Some symbols in each slot are used to transmit RS 140, which enables channel estimation and coherent demodulation of the received data and/or UCI signals. The transmission BW includes frequency resource units that will be referred to herein as Physical Resource Blocks (PRBs). Each PRB includes $N_{sc}^{RB}$, sub-carriers, or Resource Elements (REs), and a UE is allocated $M_{PUSCH}$ PRBs 150 for a total of $M_{sc}^{PUSCH} = M_{PUSCH} \cdot N_{sc}^{RB}$ REs for the PUSCH transmission BW. The last sub-frame symbol may be used for the transmission of Sounding RS (SRS) 160 from one or more UEs. The SRS provides Node B with a CQI estimate for the UL channel medium for the respective UE. The SRS transmission parameters are semi-statically configured by Node B to each UE through higher layer signaling such as, for example, Radio Resource Control (RRC) signaling. The number of sub-frame symbols available for data transmission is $N_{symb}^{PUSCH} = 2 \cdot (N_{symb}^{UL} - 1) - N_{SRS}$, where $N_{SRS} = 1$ if the last sub-frame symbol is used for SRS transmission having overlapping BW with PUSCH BW, and $N_{SRS} = 0$ otherwise.

FIG. 2 illustrates a conventional transmitter for transmitting data, CSI, and HARQ-ACK signals in a PUSCH. Coded CSI bits 205 and coded data bits 210 are multiplexed 220. HARQ-ACK bits are then inserted by puncturing data bits and/or CSI bits 230. The Discrete Fourier Transform (DFT) is then performed by the DFT unit 240, the REs are then selected by the sub-carrier mapping unit 250 corresponding to the PUSCH transmission BW from controller 255, the Inverse Fast Fourier Transform (IFFT) is performed by an IFFT unit 260 and finally CP insertion is performed by a CP insertion unit 270, and time windowing is performed by filter 280, thereby generating a transmitted signal 290. The PUSCH transmission is assumed to be over clusters of contiguous REs in accordance to the DFT Spread Orthogonal Frequency Division Multiple Access (DFT-S-OFDMA) method for signal transmission over one cluster 295A (also known as Single-Carrier Frequency Division Multiple Access (SC-FDMA)), or over multiple non-contiguous clusters 295B.

FIG. 3 illustrates a conventional receiver for receiving a transmission signal as illustrated in FIG. 2. After an antenna receives the Radio-Frequency (RF) analog signal and after further processing units (such as filters, amplifiers, frequency down-converters, and analog-to-digital converters)

which are not illustrated for brevity, the received digital signal 310 is filtered by filter 320 and the CP is removed by CP removal unit 330. Subsequently, the receiver unit applies a Fast Fourier Transform (FFT) by an FFT unit 340, selects the REs used by the transmitter using a sub-carrier demapping unit 350 under a control of controller 355, applies an Inverse DFT (IDFT) using an IDFT unit 360, an extraction unit 370 extracts the HARQ-ACK bits, and a de-multiplexing unit 380 de-multiplexes the data bits 390 and CSI bits 395.

For HARQ-ACK or RI transmission in a PUSCH, a UE determines the respective number of coded symbols Q' as shown in Equation (1):

$$Q' = \min\left(\left\lceil \frac{O \cdot \beta_{offset}^{PUSCH}}{Q_m \cdot R} \right\rceil, 4 \cdot M_{sc}^{PUSCH}\right) \quad (1)$$

where O is a number of HARQ-ACK information bits or RI information bits, $\beta_{offset}^{PUSCH}$ is informed to the UE through RRC signaling, $Q_m$ is a number of data bits per modulation symbol ($Q_m$=2, 4, 6 for QPSK, QAM16, QAM64, respectively), R a data code rate for an initial PUSCH transmission for the same TB, $M_{sc}^{PUSCH}$ is a PUSCH transmission BW in a current sub-frame, and $\lceil \ \rceil$ indicates a ceiling operation that rounds a number to its next integer. The maximum number of HARQ-ACK or RI REs is limited to the REs of 4 DFT-S-OFDM symbols (4·$M_{sc}^{PUSCH}$).

The number of HARQ-ACK or RI coded symbols in Equation (1) is derived subject to achieving the respective reception reliability target (BLER) depending on the data reception reliability target (BLER). For given UL channel conditions, the data BLER depends on the data MCS, as defined by the product $Q_m$·R, and the link between the HARQ-ACK BLER or RI BLER and the data BLER is established by the $\beta_{offset}^{PUSCH}$ parameter. For a fixed UCI BLER target, the $\beta_{offset}^{PUSCH}$ parameter allows Node B scheduler to vary the data BLER by also varying the $\beta_{offset}^{PUSCH}$ value. For example, from Equation (1), Node B scheduler can increase the data BLER target (by increasing $Q_m$·R) and maintain the same UCI BLER target by applying a same increase to the $\beta_{offset}^{PUSCH}$ value.

The reason for dimensioning the number of coded HARQ-ACK or RI symbols in Equation (1) relative to the initial PUSCH transmission for the same TB is because the respective target BLER is determined relative to the data BLER for the initial PUSCH transmission of the same TB. Moreover, HARQ retransmissions of the same TB may be non-adaptive.

The data code rate R for the initial PUSCH transmission of the same TB is defined as in Equation (2):

$$R = \left(\sum_{r=0}^{C-1} K_r\right) \Big/ (Q_m \cdot M_{sc}^{PUSCH-initial} \cdot N_{symb}^{PUSCH-initial}) \quad (2)$$

where C is a total number of data code blocks of the TB, $K_r$ is a number of bits for data code block number r, and $M_{sc}^{PUSCH-initial}$ and $N_{symb}^{PUSCH-initial}$ are respectively a PUSCH BW (number of sub-carriers) and a number of DFT-S-OFDM symbols. Therefore, Equation (1) is equivalent to Equation (3):

$$Q' = \min\left(\left\lceil \frac{O \cdot \beta_{offset}^{PUSCH} \cdot M_{sc}^{PUSCH-initial} \cdot N_{symb}^{PUSCH-initial}}{\sum_{r=0}^{C-1} K_r} \right\rceil, 4 \cdot M_{sc}^{PUSCH}\right) \quad (3)$$

When the UE receives one TB, the HARQ-ACK includes 1 bit which is encoded as a binary '1' if the TB is correctly received (positive acknowledgement or ACK), or as a binary '0' if the TB is incorrectly received (negative acknowledgment or NACK). When the UE receives two TBs, the HARQ-ACK includes 2 bits [$o_0^{ACK} \ o_1^{ACK}$] with $o_0^{ACK}$ for TB 0 and $o_1^{ACK}$ for TB 1. The encoding for the HARQ-ACK bits is given in Table 1 below, where $o_2^{ACK}=(o_0^{ACK}+o_1^{ACK})$ mod 2 to provide a (3, 2) simplex code for the 2-bit HARQ-ACK transmission.

TABLE 1

| | Encoding for 1-bit and 2-bits of HARQ-ACK | |
|---|---|---|
| m | Encoded HARQ-ACK - 1 bit | Encoded HARQ-ACK - 2 bits |
| | [$o_0^{ACK}$ y] | [$o_0^{ACK} \ o_1^{ACK} \ o_2^{ACK} \ o_0^{ACK} \ o_1^{ACK} \ o_2^{ACK}$] |
| | [$o_0^{ACK}$ y x x] | [$o_0^{ACK} \ o_1^{ACK}$ x x $o_2^{ACK} \ o_0^{ACK}$ x x $o_1^{ACK} \ o_2^{ACK}$ x x] |
| | [$o_0^{ACK}$ y x x x x ] | [$o_0^{ACK} \ o_1^{ACK}$ x x x x $o_2^{ACK} \ o_0^{ACK}$ x x x x $o_1^{ACK} \ o_2^{ACK}$ x x x x] |

For CQI/PMI multiplexing in a PUSCH, a UE determines a respective number of coded symbols Q' as shown in Equation (4):

$$Q' = \min\left(\left\lceil \frac{(O+L) \cdot \beta_{offset}^{PUSCH}}{Q_m \cdot R} \right\rceil, M_{sc}^{PUSCH} \cdot N_{symb}^{PUSCH} - \frac{Q_{RI}}{Q_m}\right) \quad (4)$$

or Equation (5):

$$Q' = \min\left(\left\lceil \frac{(O+L) \cdot \beta_{offset}^{PUSCH} \cdot M_{sc}^{PUSCH-initial} \cdot N_{symb}^{PUSCH-initial}}{\sum_{r=0}^{C-1} K_r} \right\rceil, \right. \quad (5)$$

$$\left. M_{sc}^{PUSCH} \cdot N_{symb}^{PUSCH} - \frac{Q_{RI}}{Q_m}\right)$$

where O is a number of CQI/PMI information bits and L is a number of Cyclic Redundancy Check (CRC) bits given by $$L = \begin{cases} 0 & O \leq 11 \\ 8 & \text{otherwise} \end{cases},$$

and $Q_{CQI}=Q_m \cdot Q'$. If RI is not transmitted, then $Q_{RI}=0$. For CQI/PMI channel coding, convolutional coding is used if O>11 bits and (32, O) Reed-Mueller (RM) block coding is used if O≤11 bits. The code words of the (32, O) block code are a linear combination of the 11 basis sequences denoted by $M_{i,n}$. Denoting the input sequence by $o_0, o_1, o_2, \ldots, o_{O-1}$ and the encoded CQI/PMI block by $b_0, b_1, b_2, b_3, \ldots, b_{B-1}$ B=32, it is $$b_i = \sum_{n=0}^{O-1} (o_n \cdot M_{i,n}) \bmod 2,$$

i=0, 1, 2, . . . , B−1. The output sequence $q_0, q_1, q_2, q_3, \ldots, q_{Q_{CQI}-1}$, is obtained by circular repetition of the encoded CQI/PMI block as $q_i = b_{(i \bmod B)}$, i=0, 1, 2, . . . , $Q_{CQI}-1$.

Among the UCI, HARQ-ACK has the highest reliability requirements and the respective REs are located next to the RS in each slot in order to obtain the most accurate channel estimate for their demodulation. When there is no CQI/PMI transmission, RI is placed at the symbols after the HARQ-ACK, while CQI/PMI transmission is uniformly multiplexed throughout the sub-frame.

FIG. 4 illustrates UCI multiplexing in a PUSCH sub-frame. The HARQ-ACK bits 410 are placed next to the RS 420 in each slot of the PUSCH sub-frame. The CQI/PMI 430 is multiplexed across all DFT-S-OFDM symbols and the remaining bits of the sub-frame carries transmission of data bits 440. As the multiplexing is prior to the DFT, a virtual frequency dimension is used for the UCI placement.

MIMO techniques are associated with signal transmissions from multiple antennas in at least partially (if not fully) overlapping time-frequency resources. The rank S of a MIMO transmission is defined as the number of spatial layers and is always smaller than or equal to the number of UE transmitter antennas T. In the UL, when the transmitter antennas are from the same UE, the MIMO technique is referred to as Single-User MIMO (SU-MIMO). When the transmitter antennas are from different UEs, the MIMO technique is referred to as Multi-User MIMO (MU-MIMO). UL SU-MIMO is typically associated with T=2 or T=4.

Different SU-MIMO techniques can be used to target different operating environments. For example, precoding with rank-1 can be used to improve coverage while spatial multiplexing with rank-4 can be used to improve Spectral Efficiency (SE) and increase data rates. The precoder is a S×T matrix. Multiple spatial streams can be encoded either jointly in a single Code Word (CW) or separately in multiple (typically two) CWs. The tradeoff of using multiple CWs is that the MCS for the respective multiple sets of spatial streams can be individually adjusted and Serial Interference Cancellation (SIC) receivers can be used which can improve SE over Minimum Mean Square Error (MMSE) receivers at the expense of increased feedback overhead over using a single CW.

FIG. 5 illustrates a CW-to-layer mapping. At most 2 CWs exist and each CW is associated with a TB (one TB can be segmented into multiple code blocks C). Each TB is associated with one HARQ process and one MCS. For rank-1 transmission 510, a single CW, $CW_0$, corresponding to a single spatial layer is precoded, either for 2 (1×2 precoder) or for 4 (1×4 precoder) UE transmitter antennas. For rank-2 transmission 520, two CWs, $CW_0$ and $CW_1$, corresponding to two spatial layers are precoded, either for 2 (2×2 precoder matrix) or for 4 (2×4 precoder matrix) UE transmitter antennas. For rank-3 transmission 530 (applicable only for 4 UE transmitter antennas), two CWs, $CW_0$ and $CW_1$, corresponding to three spatial layers are precoded (3×4 precoder matrix) where $CW_0$ is transmitted using one spatial layer and $CW_1$ is transmitted using two spatial layers. For rank-4 transmission 540 (applicable only for 4 UE transmitter antennas), two CWs, $CW_0$ and $CW_1$, corresponding to four spatial layers are precoded (4×4 precoder matrix) where each CW is transmitted using two spatial layers.

For UCI multiplexing in a PUSCH with SU-MIMO transmission, the only practical choices are to either multiplex UCI in one CW or in both CWs. The present invention considers the case that both CWs are used. The UCI is equally replicated across all spatial layers of both CWs and Time Division Multiplexing (TDM) between UCI and data is such that the UCI symbols are time-aligned across all layers.

FIG. 6 illustrates the above principle for the case of HARQ-ACK and 2 layers (corresponding to 2 CWs). The same REs and DFT-S-OFDM symbols are used for multiplexing HARQ-ACK 610 in the first spatial layer (Layer 0 620) and for multiplexing HARQ-ACK 630 in the second spatial layer (Layer 1 640).

When UCI is multiplexed into multiple spatial layers and multiple CWs (multiple TBs) of the same PUSCH transmission with SU-MIMO, the previous expressions for determining the number of REs used for UCI transmission are no longer applicable. Moreover, Node B scheduler may assign different BLER operating points to the different TBs conveyed respectively by the different CWs (for example, in order to improve the performance of a SIC receiver, the initial reception of $CW_0$ may be more reliable than of $CW_1$).

Therefore, there is a need to determine the number of coded UCI symbols in each spatial layer in a PUSCH with SU-MIMO transmission.

There is another need to allow reliable reception of UCI transmitted in multiple TBs when these TBs have different reception reliability characteristics.

There is another need to simplify the processing for the reception of UCI transmitted in multiple TBs.

Finally, there is another need to determine the number of coded UCI symbols in each spatial layer in a PUSCH with transmission of a single TB corresponding to a retransmission of a HARQ process having multiple TBs in the initial PUSCH transmission that include the single TB.

SUMMARY OF THE INVENTION

Accordingly, an aspect of the present invention is to address at least the aforementioned limitations and problems in the prior art and to provide at least the advantages described below.

Accordingly, an aspect of the present invention provides methods and apparatuses for a UE to multiplex control information in a PUSCH conveying data information over multiple spatial layers using a MIMO transmission principle.

In accordance with an aspect of the present invention, a UE is assigned by a base station PUSCH transmission from multiple transmitter antennas in multiple spatial layers over a number of sub-carriers $M_{sc}^{PUSCH}$ in the frequency domain and over a number of symbols in the time domain. The PUSCH transmission includes two CWs, $CW_0$ and $CW_1$, with each CW conveying a corresponding TB of data information, $TB_0$ and $TB_1$ with the transmission of each TB being associated with a respective HARQ process, and with $CW_0$ having a first MCS, $MCS_0$, and $CW_1$ having a second MCS, $MCS_1$. The UE computes the average MCS from the first MCS and the second MCS for the initial PUSCH transmissions of $TB_0$ and $TB_1$ for the respective HARQ processes and determines the number of coded control information symbols Q' in each spatial layer to be proportional to the product of the number of control information bits O and a parameter $\beta_{offset}^{PUSCH}$ assigned to the UE by the base station through radio resource control signaling and to be inversely proportional to the average MCS or, equivalently, $$Q' = \min\left(\left\lceil \frac{O \cdot \beta_{offset}^{PUSCH}}{\frac{\sum_{r=0}^{C^0-1} K_r^0}{M_{sc}^{PUSCH-initial(0)} \cdot N_{symb}^{PUSCH-initial(0)}} + \frac{\sum_{r=0}^{C^1-1} K_r^1}{M_{sc}^{PUSCH-initial(1)} \cdot N_{symb}^{PUSCH-initial(1)}}} \right\rceil, 4 \cdot M_{sc}^{PUSCH}\right),$$

wherein the $\lceil\ \rceil$ function is a ceiling operation that rounds a number to its next integer and, for j=0,1, $MCS_j = Q_m^j \cdot R_j$ with $Q_m^j$ and $R^j$ being respectively the modulation order and coding rate for the initial PUSCH transmission of $TB_j$ for the respective HARQ process and $$R^j = \left(\sum_{r=0}^{C^j-1} K_r^0\right) / \left(Q_m^j \cdot M_{sc}^{PUSCH-initial(j)} \cdot N_{symb}^{PUSCH-initial(j)}\right)$$

where $C^j$ is the total number of code blocks for $TB_j$, $K_r^j$ is the number of bits for code block r in $TB_j$, $M_{sc}^{PUSCH-initial(j)}$ is the number of sub-carriers in the initial PUSCH, and $N_{symb}^{PUSCH-initial(j)}$ is the number of symbols in the initial PUSCH.

In accordance with another aspect of the present invention, a UE determines the same number of coded control information symbols when it is assigned by the base station initial PUSCH transmission from multiple transmitter antennas in a single spatial layer and when it is assigned by the base station initial PUSCH transmission from a single transmitter antenna.

In accordance with another aspect of the present invention, the base station assigns to a UE a first parameter value $\beta_{offset,SU-MIMO}^{PUSCH}$ to use for computing the number of coded control information symbols in each spatial layer of a PUSCH transmission conveying multiple TBs and a second parameter value $\beta_{offset}^{PUSCH}$ to use for computing the number of coded control information symbols in each spatial layer of a PUSCH transmission conveying a single TB.

In accordance with another aspect of the present invention, the modulation of the coded control information symbols in each spatial layer of a PUSCH transmission conveying multiple TBs is the modulation with the smaller order of the data information in the multiple TBs.

In accordance with another aspect of the present invention, a UE is assigned by a base station a first PUSCH transmission from multiple transmitter antennas to convey data information in multiple spatial layers and in two CWs, $CW_0$ and $CW_1$, with each CW conveying a corresponding TB, $TB_0$ and $TB_1$, of data information, and is assigned a second PUSCH to convey data information in a single spatial layer or in multiple spatial layers (from a single or from multiple transmitter antennas) for a retransmission of either $TB_0$ or $TB_1$ for the respective HARQ process, and the UE multiplexes control information of O bits with data information in the second PUSCH over a number of sub-carriers $M_{sc}^{PUSCH}$. The UE determines the number of coded control information symbols Q' in each spatial layer by applying a first parameter value $\beta_{offset,CW_0}^{PUSCH}$ if the retransmission is for the first TB from the two TBs and by applying a second parameter value $\beta_{offset,CW_1}^{PUSCH}$ if the retransmission is for the second TB from the two TBs, wherein the first parameter value $\beta_{offset,CW_0}^{PUSCH}$ and the second parameter value $\beta_{offset,CW_j}^{PUSCH}$ are assigned to the UE by the base station using radio resource control signaling. The number of coded control information symbols in each spatial layer if the retransmission is for $TB_j$, j=0,1, is obtained as $$Q' = \min\left(\left\lceil \frac{O \cdot M_{sc}^{PUSCH-initial(j)} \cdot N_{symb}^{PUSCH-initial(j)} \cdot \beta_{offset,CW_1}^{PUSCH}}{\sum_{r=0}^{C^j-1} K_r^j} \right\rceil, 4 \cdot M_{sc}^{PUSCH}\right)$$

wherein $\lceil\ \rceil$ is a ceiling function that rounds a number to its next integer and, for the initial PUSCH transmission of $TB_j$, $C^j$ is the total number of code blocks, $K_r^j$ is the number of bits for code block r, $M_{sc}^{PUSCH-initial(j)}$ is the number of sub-carriers, and $N_{symb}^{PUSCH-initial(j)}$ is the number of symbols.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

Various embodiments of the present invention will be described below in detail with reference to the accompanying drawings. This invention may, however, be embodied in many different forms and should not be construed as limited to the embodiments set forth herein. Rather, these embodiments are provided so that this disclosure will be thorough and complete and will fully convey the scope of the invention to those skilled in the art.

Additionally, although the present invention is described for a Discrete Fourier Transform Spread Orthogonal Frequency Division Multiple Access (DFT-S-OFDMA) transmission, it also applies to all Frequency Division Multiplexing (FDM) transmissions in general and to Single-Carrier Frequency Division Multiple Access (SC-FDMA) and OFDM in particular.

In accordance with an embodiment of the present invention, the number of coded UCI symbols in each spatial layer is derived for a PUSCH with SU-MIMO transmission of the data information over two CWs, $CW_0$ and $CW_1$ (transmissions of data information with rank-2, rank-3, and rank-4) conveying, respectively, two TBs, $TB_0$ and $TB_1$. For rank-1 transmission (single spatial layer), the same derivation for the number of coded UCI symbols as for the case of a single UE transmitter antenna applies. The description primarily considers the HARQ-ACK or RI control information but the same principles can be directly extended to the CQI/PMI.

Figure 7:
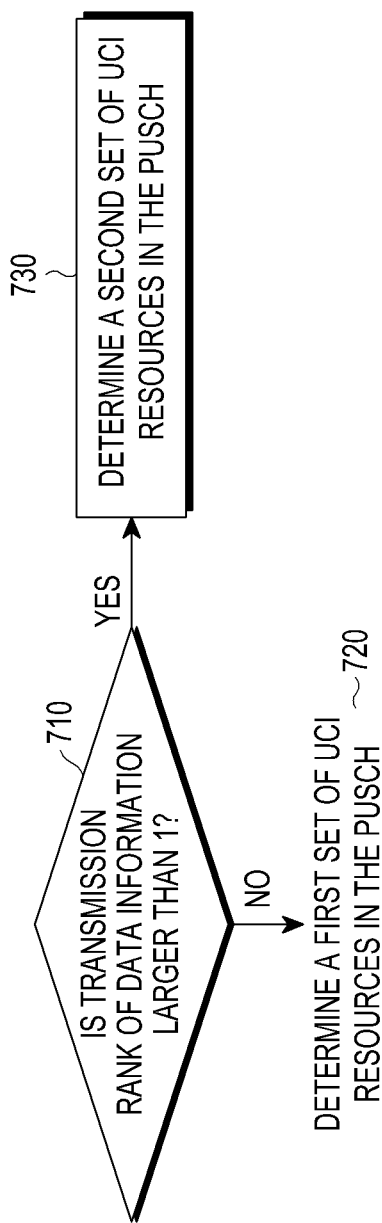
FIG. 7 is a diagram illustrating the principle for determining the number of coded UCI symbols in each spatial layer in a PUSCH in accordance with the transmission rank for the data information.

FIG. 7 illustrates the general principle for the determination of the number of coded UCI symbols in each spatial layer of a PUSCH with SU-MIMO transmission in order to achieve the desired target for the UCI reception reliability. Depending on the transmission rank of the data information 710 (for the initial PUSCH transmission), the UE determines a first number of coded UCI symbols if the transmission rank is 1, as in 720 and determines a second number of coded UCI symbols (for each spatial layer) if the transmission rank is larger than 1, as in 730.

The data information in $CW_0$ ($TB_0$) has modulation order $Q_m^0$ and coding rate $$R^0 = \left(\sum_{r=0}^{C^0-1} K_r^0\right) \Big/ \left(Q_m^0 \cdot M_{sc}^{PUSCH-initial(0)} \cdot N_{symb}^{PUSCH-initial(0)}\right)$$

while the data information in $CW_1$ ($TB_1$) has modulation order $Q_m^1$ and coding rate $$R^1 = \left(\sum_{r=0}^{C^1-1} K_r^1\right) \Big/ \left(Q_m^1 \cdot M_{sc}^{PUSCH-initial(1)} \cdot N_{symb}^{PUSCH-initial(1)}\right)$$

where, for the initial transmission of $TB_j$, (j=0,1), $C^j$ is the total number of code blocks for $TB_j$, $K_r^j$ is the number of bits for code block r and, $M_{sc}^{PUSCH-initial(j)}$ is the number of sub-carriers, and $N_{symb}^{PUSCH-initial(j)}$ is the number of symbols.

If only $CW_0$ ($TB_0$) is transmitted, the number of coded UCI symbols (per spatial layer) is $$Q'_0 = \min\left(\left\lceil \frac{O \cdot \beta_{offset}^{PUSCH}}{Q_m^0 \cdot R^0} \right\rceil, 4 \cdot M_{sc}^{PUSCH}\right).$$

If only $CW_1$ ($TB_1$) is transmitted, the number of coded UCI symbols is $$Q'_1 = \min\left(\left\lceil \frac{O \cdot \beta_{offset}^{PUSCH}}{Q_m^1 \cdot R^1} \right\rceil, 4 \cdot M_{sc}^{PUSCH}\right).$$

It assumed that the data information can have different MCS for the two TBs, that is $MCS_0 = Q_m^0 \cdot R^0$ can be different than $MCS_1 = Q_m^1 \cdot R^1$.

Figure 6:
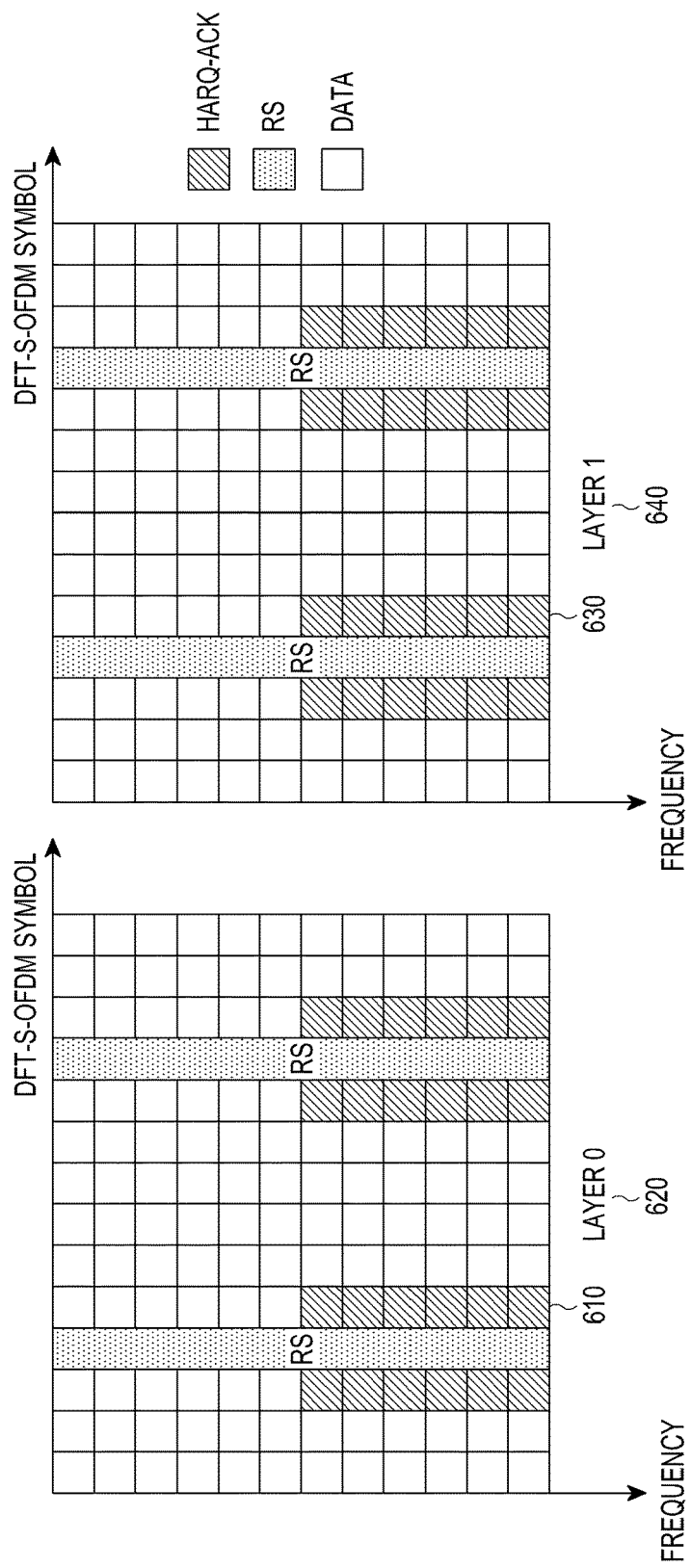
FIG. 6 is a diagram illustrating a UCI multiplexing by applying equal replication and time-alignment across all layers of both CWs and TDM between UCI symbols and data symbols.

The objective is to determine the number of coded UCI symbols where both CWs (TBs) are transmitted in a PUSCH subject to the design constraint that the UCI is replicated across all layers of both CWs and the coded UCI symbols are time-aligned across all layers as illustrated in FIG. 6.

Figure 1:
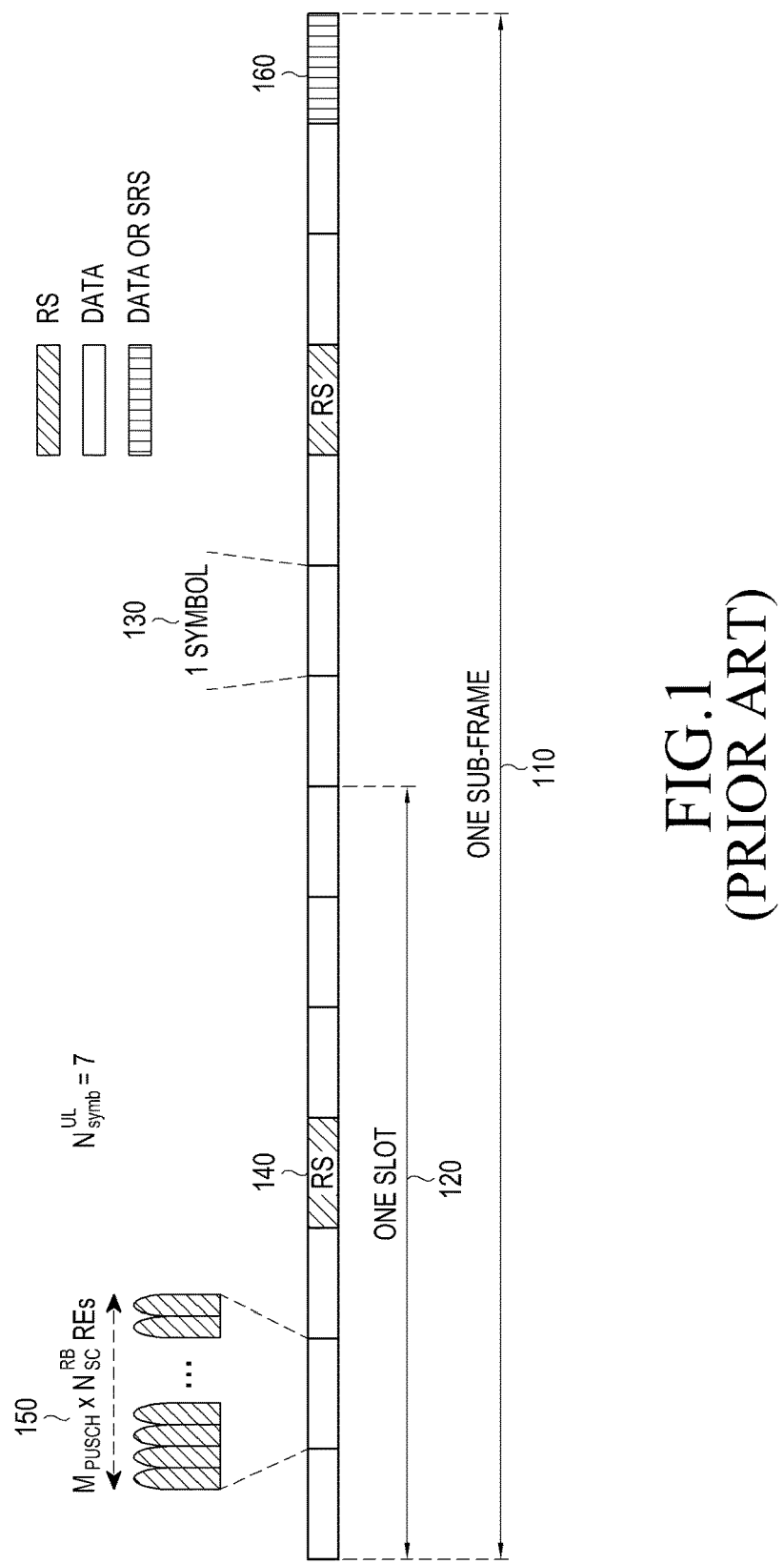
FIG. 1 is a diagram illustrating a conventional PUSCH sub-frame structure.
Figure 2:
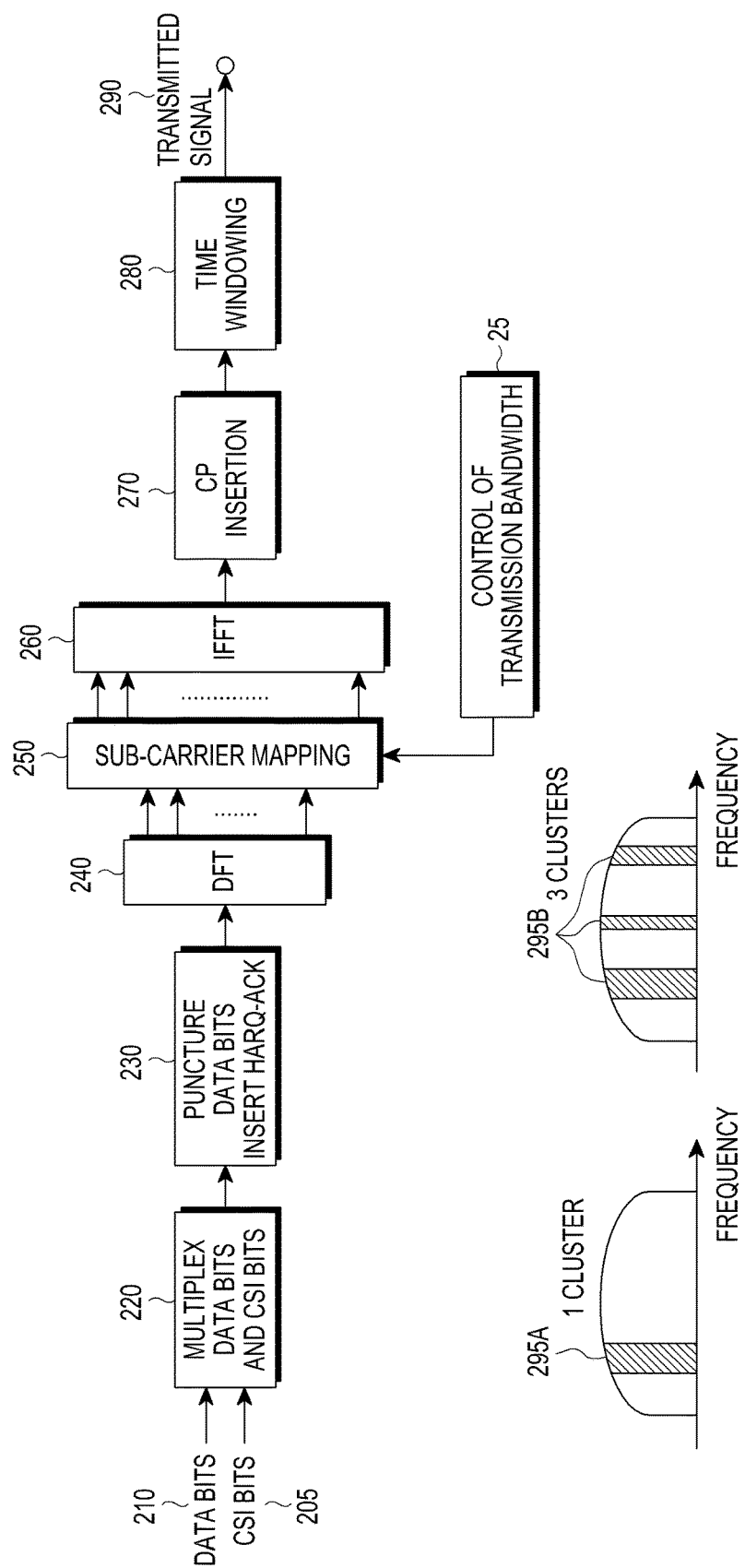
FIG. 2 is a block diagram illustrating a conventional transmitter structure for transmitting data, CSI, and HARQ-ACK signals in a PUSCH.
Figure 3:
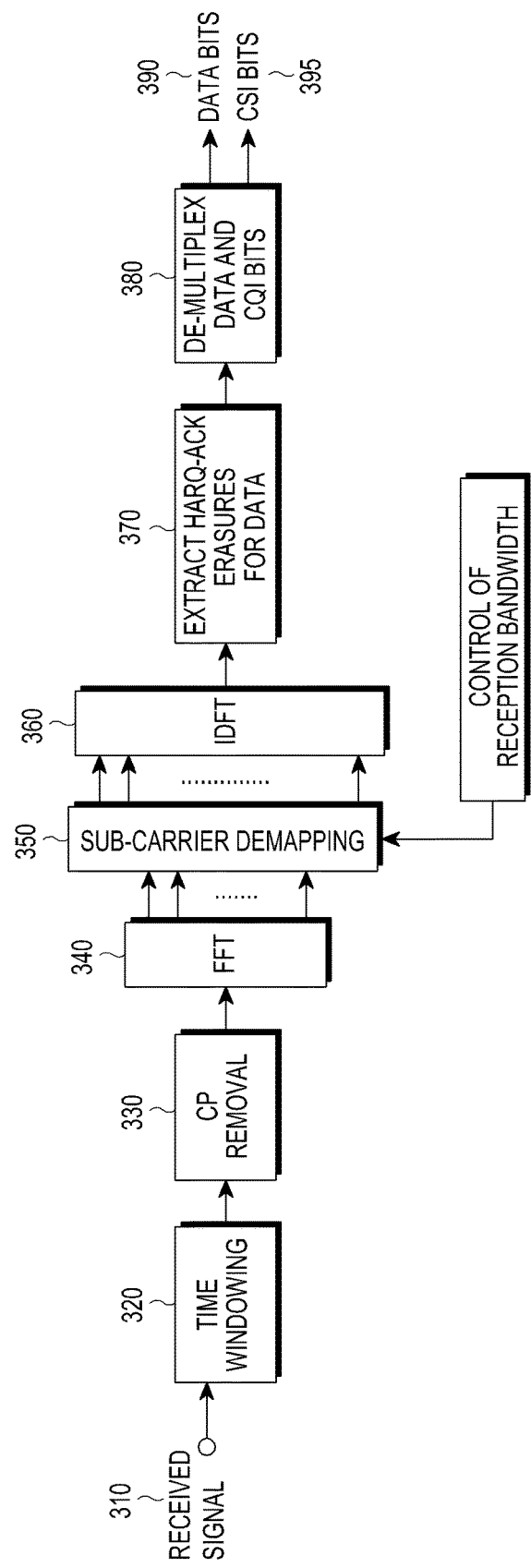
FIG. 3 is a block diagram illustrating a conventional receiver structure for receiving data, CSI, and HARQ-ACK signals in a PUSCH.
Figure 4:
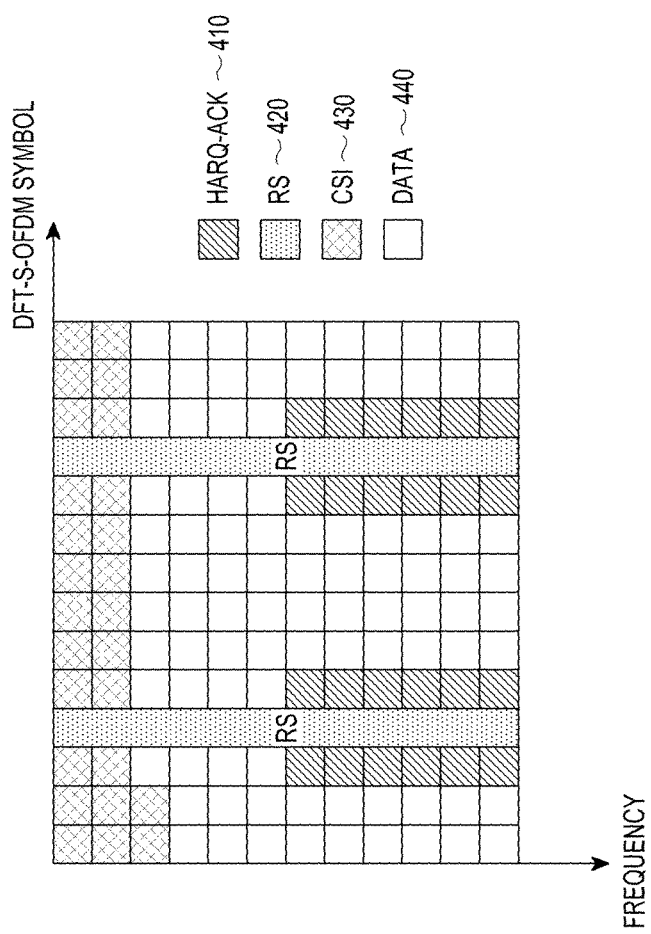
FIG. 4 is a diagram illustrating conventional multiplexing of UCI and data in a PUSCH.
Figure 5:
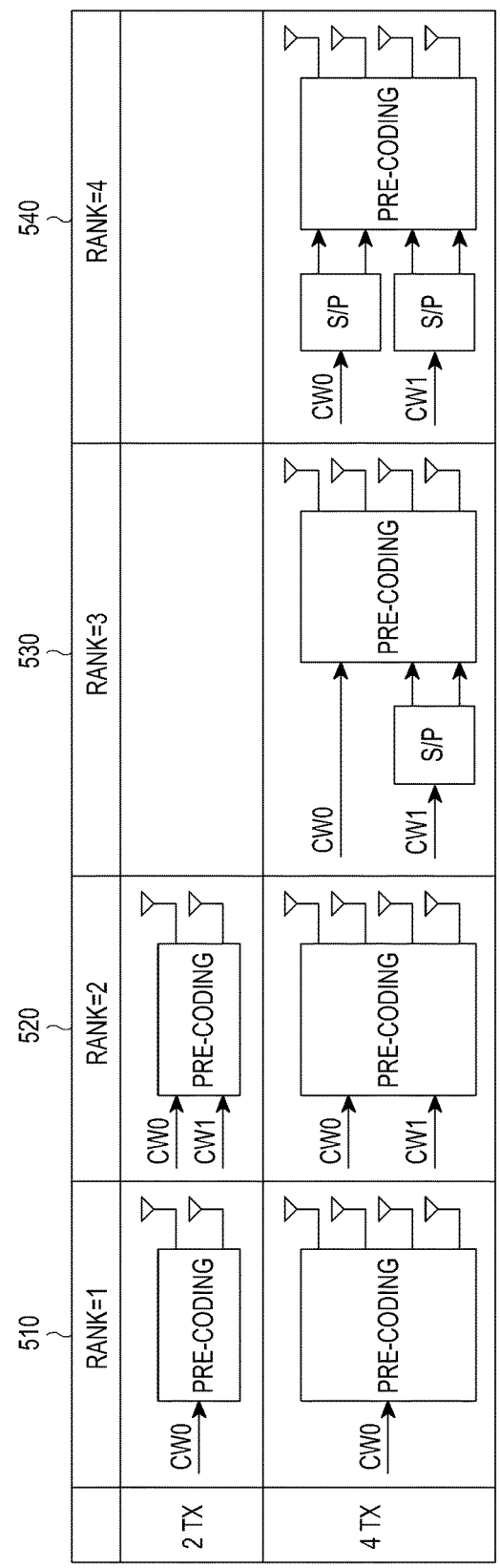
FIG. 5 is a diagram illustrating the concept of CW-to-layer mapping in accordance with a MIMO transmission principle.

For rank-2 or rank-4 transmission of the data information, it is assumed that the same number of spatial layers is allocated among the CWs (TBs) as illustrated in FIG. 5. For a rank-3 transmission of the data information, $CW_0$ ($TB_0$) is allocated one spatial layer while $CW_1$ ($TB_1$) is allocated two spatial layers but the precoder is such that the transmission power is twice for the single spatial layer allocated to $CW_0$ ($TB_1$). For example, one precoder W for rank-3 can be as in the matrix Equation (6):

$$W = \begin{bmatrix} 1 & 0 & 0 \\ 1 & 0 & 0 \\ 0 & 1 & 0 \\ 0 & 0 & 1 \end{bmatrix}. \tag{6}$$

Since the transmission power per CW is the same regardless if rank-2, rank-3, or rank-4 SU-MIMO is used, assuming that the capacity curve is linear between the SINR operating points for the two CWs, the virtual MCS, $MCS_{virtual}$, of the combined transmission of the data information in the two TBs for the respective two CWs can be viewed as the average of the individual MCS. Consequently, subject to the previously mentioned design constraint and considering that the number of coded UCI symbols in each spatial layer is inversely proportional to the MCS of the data information, the coded UCI symbols used in each of the spatial layers of the two CWs are determined as in Equation (7):

$$Q'_{SU-MIMO} = \min\left(\left\lceil\frac{O \cdot \beta_{offset}^{PUSCH}}{MCS_{virtual}}\right\rceil, 4 \cdot M_{sc}^{PUSCH}\right) \quad (7)$$

$$= \min\left(\left\lceil\frac{O \cdot \beta_{offset}^{PUSCH}}{(Q_m^0 \cdot R^0 + Q_m^1 \cdot R^1)/2}\right\rceil, 4 \cdot M_{sc}^{PUSCH}\right)$$

or equivalently, by absorbing the factor of 2 in the $\beta_{offset}^{PUSCH}$ value, as in Equation (8):

$$Q'_{SU-MIMO} = \min\left(\left\lceil\frac{O \cdot \beta_{offset}^{PUSCH}}{\frac{\sum_{r=0}^{C^0-1} K_r^0}{M_{sc}^{PUSCH-initial(0)} \cdot N_{symb}^{PUSCH-initial(0)}} + \frac{\sum_{r=0}^{C^1-1} K_r^1}{M_{sc}^{PUSCH-initial(1)} \cdot N_{symb}^{PUSCH-initial(1)}}}\right\rceil, 4 \cdot M_{sc}^{PUSCH}\right) \quad (8)$$

Figure 8:
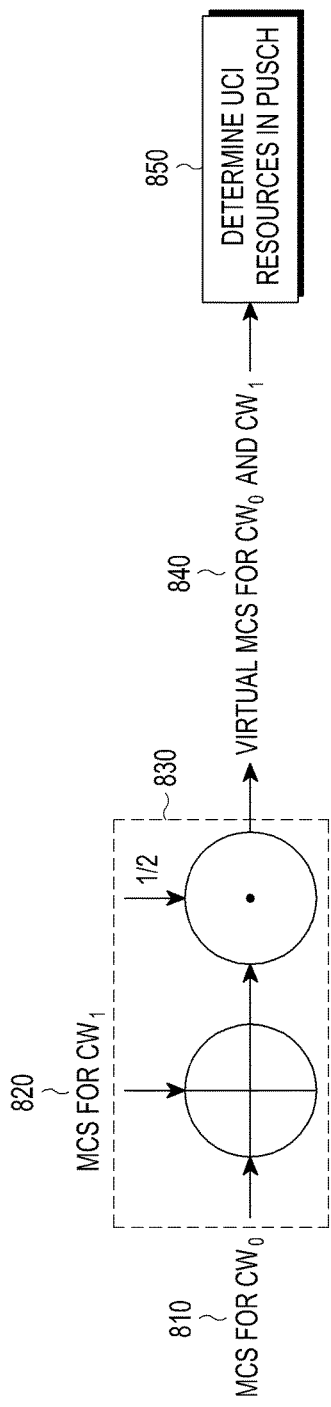
FIG. 8 is a diagram illustrating the use of a virtual MCS, determined as the average of the MCS used for the transmission of the respective TBs in the PUSCH, to determine the number of coded UCI symbols in each spatial layer.

FIG. 8 illustrates the concept of using a virtual MCS which is determined as the average of the MCS used for the transmission of data information in $CW_0$ (for $TB_0$), $MCS_0$, and the MCS used for the transmission of data information in $CW_1$ (for $TB_1$), $MCS_1$. The average 830 of the MCS for $CW_0$ 810 and the MCS for $CW_1$ 820 are computed to provide the virtual MCS, $MCS_{virtual}$, for the data transmission with $CW_0$ and $CW_1$ 840. This virtual MCS can then be used to compute the number of coded UCI symbols in spatial layer 850 as in Equation (8).

In accordance with another embodiment of the present invention, the accuracy for the required number of coded UCI symbols in each spatial layer is further improved where the data information in each CW (TB) can have different target BLER. Then, assuming that the UCI target BLER is predetermined and independent of the data information BLER in each CW (TB), the $\beta_{offset,CW_0}^{PUSCH}$ offset value that would be used to determine the coded UCI symbols in each spatial layer where only $CW_0$ ($TB_0$) was transmitted would be different than the $\beta_{offset,CW_1}^{PUSCH}$ offset value that would be used to determine the number of coded UCI symbols in each spatial layer where only $CW_1$ ($TB_1$) was transmitted. Then, the number of coded UCI symbols in each spatial layer for SU-MIMO transmission with 2 CWs is determined based on the average of the total number of coded UCI symbols in each spatial layer corresponding to individual CW transmissions as in Equation (9):

$$Q'_{SU-MIMO} = \min\left(\left\lceil\frac{O}{\left(\frac{Q_m^0 \cdot R^0}{\beta_{offset,CW_0}^{PUSCH}} + \frac{Q_m^1 \cdot R^1}{\beta_{offset,CW_1}^{PUSCH}}\right)/2}\right\rceil, 4 \cdot M_{sc}^{PUSCH}\right) \quad (9)$$

$$= \min\left(\left\lceil\frac{2 \cdot O \cdot \beta_{offset,CW_0}^{PUSCH}}{Q_m^0 \cdot R^0 + Q_m^1 \cdot R^1 \cdot \frac{\beta_{offset,CW_0}^{PUSCH}}{\beta_{offset,CW_1}^{PUSCH}}}\right\rceil, 4 \cdot M_{sc}^{PUSCH}\right)$$

or equivalently, by absorbing the factor of 2 in the $\beta_{offset}^{PUSCH}$ values, as in Equation (10):

$$Q'_{SU-MIMO} = \quad (10)$$

$$\min\left(\left\lceil\frac{O \cdot \beta_{offset,CW_0}^{PUSCH}}{\frac{\sum_{r=0}^{C^0-1} K_r^0}{M_{sc}^{PUSCH-initial(0)} \cdot N_{symb}^{PUSCH-initial(0)}} + \frac{\sum_{r=0}^{C^1-1} K_r^1}{M_{sc}^{PUSCH-initial(1)} \cdot N_{symb}^{PUSCH-initial(1)}} \cdot \frac{\beta_{offset,CW_0}^{PUSCH}}{\beta_{offset,CW_1}^{PUSCH}}}\right\rceil, 4 \cdot M_{sc}^{PUSCH}\right)$$

Figure 9:
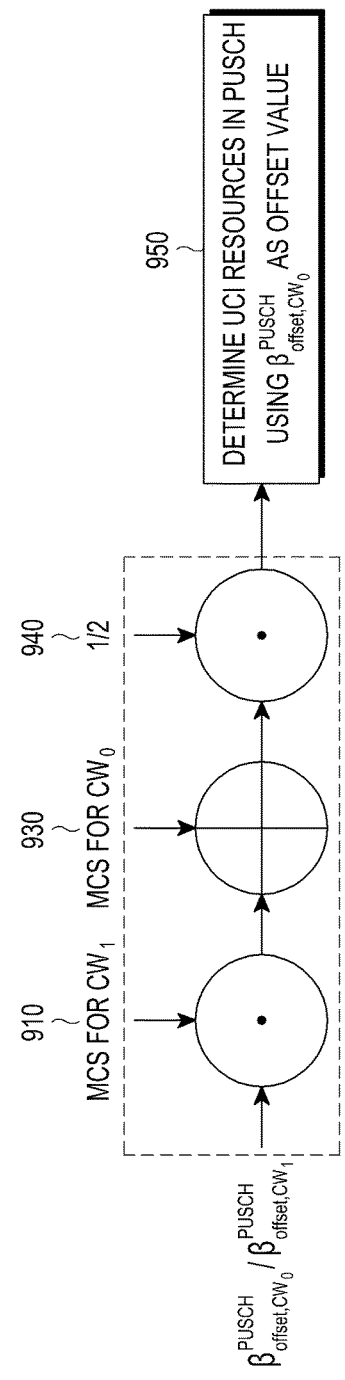
FIG. 9 is a diagram illustrating the determination for the number of coded UCI symbols in each spatial layer of a PUSCH transmission with 2 TBs while accounting for the possibility to have different BLER operating points for each TB.

FIG. 9 illustrates determining the number of coded UCI symbols in each spatial layer in a PUSCH using SU-MIMO transmission with 2 CWs (2 TBs) for the data information while accounting for the possibility to have different BLER targets for the data information in each CW (TB). The MCS for $CW_1$ 910 is scaled by $\beta_{offset,CW_0}^{PUSCH}/\beta_{offset,CW_1}^{PUSCH}$ 920 and the result is added to the MCS for $CW_0$ 930. The output is then scaled by ½940 (may be omitted by absorbing the factor of 2 in the $\beta_{offset}^{PUSCH}$ values) and the result is then used as a new virtual MCS for obtaining the number of coded UCI symbols in each spatial layer based on the $\beta_{offset,CW_0}^{PUSCH}$ offset value 950 as described in Equation (10).

Alternatively, assuming that the capacity curve is linear between the two SINR points corresponding to the BLER targets for the data information in the two CWs (TBs), a new $\beta_{offset}^{PUSCH}$ offset value that is common to both CWs (TBs) can be defined where of SU-MIMO PUSCH transmissions, for example as $\beta_{offset,SU-MIMO}^{PUSCH} = (\beta_{offset,CW_0}^{PUSCH} + \beta_{offset,CW_1}^{PUSCH})/2$, and the number of coded UCI symbols in each spatial layer can be obtained as in Equation (11):

$$Q'_{SU-MIMO} = \min\left(\left\lceil\frac{O \cdot \beta_{offset,SU-MIMO}^{PUSCH}}{\frac{\sum_{r=0}^{C^0-1} K_r^0}{M_{sc}^{PUSCH-initial(0)} \cdot N_{symb}^{PUSCH-initial(0)}} + \frac{\sum_{r=0}^{C^1-1} K_r^1}{M_{sc}^{PUSCH-initial(1)} \cdot N_{symb}^{PUSCH-initial(1)}}}\right\rceil, 4 \cdot M_{sc}^{PUSCH}\right) \quad (11)$$

The factor of 2 is now absorbed in the new $\beta_{offset,SU-MIMO}^{PUSCH}$ parameter.

In accordance with another embodiment of the present invention, the number of coded UCI symbols in each spatial layer is determined where only a single CW (TB) is used (in a single spatial layer or in multiple spatial layers) for the PUSCH transmission of data information corresponding to a TB retransmission for the same HARQ process (the TB corresponding to the data information in the other CW is assumed to be correctly received in the previous PUSCH transmission for the same HARQ process). Then, the number of coded UCI symbols in each spatial layer is determined using a same approach as for a PUSCH transmission from a single UE antenna for the respective CW. Therefore, if only $CW_0$ ($TB_0$) is included in a PUSCH transmission corresponding to a TB retransmission for the same HARQ process, the number of coded UCI symbols in each spatial layer is determined as in Equation (12):

$$Q'_{CW_0} = \min\left(\left\lceil \frac{O \cdot M_{sc}^{PUSCH-initial(0)} \cdot N_{symb}^{PUSCH-initial(0)} \cdot \beta_{offset,\,CW_0}^{PUSCH}}{\sum_{r=0}^{C^0-1} K_r^0} \right\rceil, 4 \cdot M_{sc}^{PUSCH}\right) \quad (12)$$

If only $CW_1$ ($TB_1$) is included in a PUSCH transmission corresponding to a TB retransmission for the same HARQ process, the number of coded UCI symbols in each spatial layer is determined as in Equation (13):

$$Q'_{CW_1} = \min\left(\left\lceil \frac{O \cdot M_{sc}^{PUSCH-initial(1)} \cdot N_{symb}^{PUSCH-initial(1)} \cdot \beta_{offset,\,CW_1}^{PUSCH}}{\sum_{r=0}^{C^1-1} K_r^1} \right\rceil, 4 \cdot M_{sc}^{PUSCH}\right) \quad (13)$$

Figure 10:
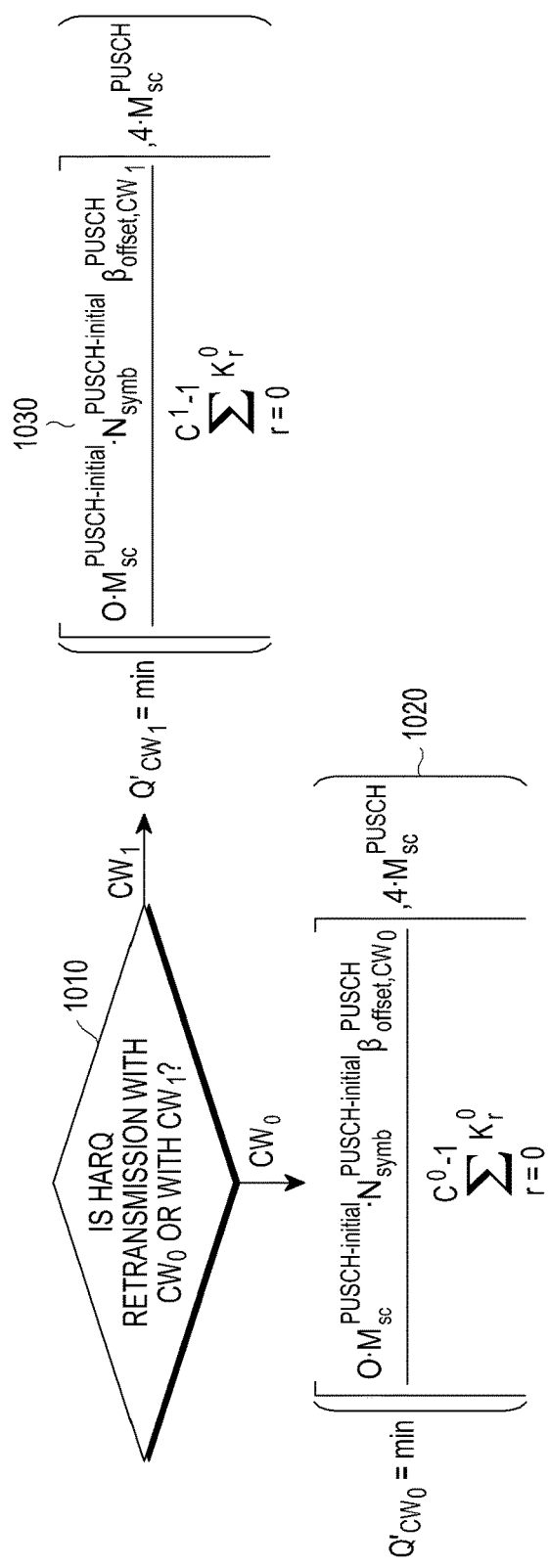
FIG. 10 is a diagram illustrating the determination for the number of coded UCI symbols in each spatial layer for the case of a single TB transmission in a PUSCH corresponding to a retransmission for an HARQ process for which an initial PUSCH transmission was with two TBs that include the single TB.

FIG. 10 illustrates the determination for the number of coded UCI symbols in each spatial layer for the case of a single CW (TB) transmission in a PUSCH corresponding to a HARQ retransmission for the TB for which the initial PUSCH transmission was with SU-MIMO and two CWs (two TBs). If UCI is included in the PUSCH during a HARQ retransmission with a single CW (TB), either $CW_0$ ($TB_0$) or $CW_1$ ($TB_1$) as in 1010, then if only $CW_0$ ($TB_0$) is retransmitted the number of coded UCI symbols in each spatial layer is determined according to the MCS of the data information and the offset for $CW_0$ ($TB_0$) as in 1020 while if only $CW_1$ ($TB_1$) is retransmitted the number of coded UCI symbols in each spatial layer is determined according to the MCS of the data information and the offset for $CW_1$ ($TB_1$) 1030.

In accordance with another embodiment of the present invention, a simplified Node B receiver processing is considered, particularly if coding is used for a multi-bit HARQ-ACK or RI transmission (such as for example block coding). In order to avoid interference among UCI transmissions in different spatial layers corresponding to different CWs (TBs) which may use different data modulation orders and to minimize UCI decoding latency, the constellation points of the same modulation order, $Q_m$, can be used for the transmission of the coded UCI symbols even when different data modulation orders are used in each of the two CWs (TBs). In this manner, the receiver can consider a single set of constellation points, corresponding to a single $Q_m$, for joint UCI detection across all spatial layers. The $Q_m$ for the transmission of the coded UCI symbols may correspond to the lower modulation order of the two data modulation orders for the respective two CWs (TBs). For example, if QAM64 ($Q_m=6$) is used for data transmission in $CW_0$ ($TB_0$) and QAM16 ($Q_m=4$) is used for data transmission in $CW_1$ ($TB_1$), then the transmission of coded UCI symbols in all spatial layers (in both CWs) uses the constellation points for $Q_m=4$ as described in Table 1. If QAM16 ($Q_m=4$) is used for data transmission in $CW_0$ ($TB_0$) and QPSK ($Q_m=2$) is used for data transmission in $CW_1$ ($TB_1$), then the transmission of coded UCI symbols in all spatial layers (in both CWs/TBs) uses the constellation points for ($Q_m=2$) as described in Table 1.

Figure 11:
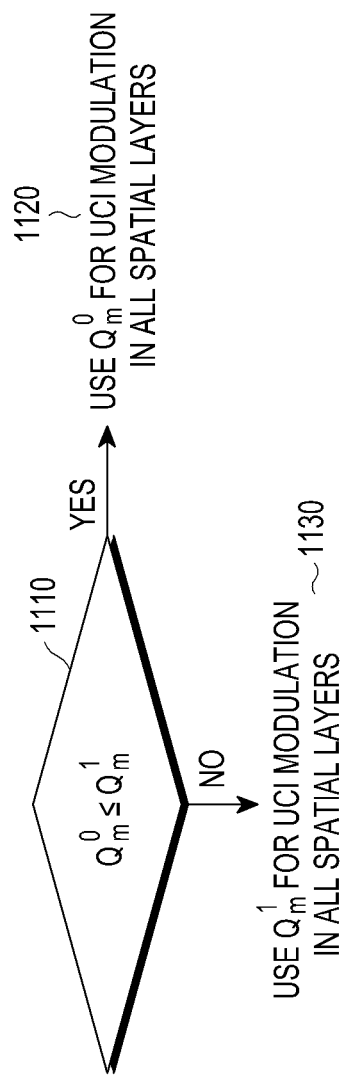
FIG. 11 is a diagram illustrating the determination of the modulation scheme for the coded UCI symbols based on the modulation scheme used for data transmission in each of the multiple CWs.

FIG. 11 illustrates the determination of $Q_m$ for the coded UCI symbols based on the data information modulation order $Q_m^0$ for $CW_0$ ($TB_0$) and $Q_m^1$ for $CW_1$ ($TB_1$). The UE determines whether $Q_m^0 \le Q_m^1$ 1110 and selects $Q_m^0$ for the modulation of the coded UCI symbols if $Q_m^0 \le Q_m^1$ 1120 while it selects $Q_m^1$ for the modulation of the coded UCI symbols if $Q_m^0 > Q_m^1$, as in 1130.

If $Q_m^0 \ne Q_m^1$ and the modulation for the coded UCI symbol is the smaller of $Q_m^0$ and $Q_m^1$, the number of coded UCI symbols in previous equations may need to be adjusted accordingly (increased) in order to maintain the same UCI BER (unless the UCI performance loss from using a lower value for one of the two MCS can be considered to be offset by the performance gain provided by the spatial beamforming gain from SU-MIMO). For example, if $Q_m^0 > Q_m^1$, Equation (11) may be modified as in Equation (14):

$$Q'_{SU-MIMO} = \min\left(\left\lceil \frac{O \cdot \beta_{offset,SU-MIMO}^{PUSCH}}{\frac{\left(\frac{Q_m^1}{Q_m^0}\right) \cdot \sum_{r=0}^{C^0-1} K_r^0}{M_{sc}^{PUSCH-initial(0)} \cdot N_{symb}^{PUSCH-initial(0)}} + \frac{\sum_{r=0}^{C^1-1} K_r^1}{M_{sc}^{PUSCH-initial(1)} \cdot N_{symb}^{PUSCH-initial(1)}}} \right\rceil, 4 \cdot M_{sc}^{PUSCH}\right) \quad (14)$$

Nevertheless, the principles for determining the number of coded UCI symbols remain the same.

While the present invention has been shown and described with reference to certain embodiments thereof, it will be understood by those skilled in the art that various changes in form and detail may be made therein without departing from the spirit and scope of the present invention as defined by the appended claims.

What is claimed is:

1. A method for transmitting uplink control information (UCI), the method comprising:
   coding data;
   when two transport blocks TBs are transmitted in a physical uplink shared channel (PUSCH), determining a number of coded modulation symbols per layer based on:
      one of a modulation order of a first TB and a modulation order of a second TB,
      a value related to a number of bits in the first TB comprising at least one code block,
      a value related to a number of bits in the second TB comprising at least one code block,
      a number of bits of the UCI, and
      an offset of the PUSCH;
   coding the UCI based on the determined number of coded modulation symbols per layer;
   multiplexing the coded data and the coded UCI; and
   transmitting the multiplexed coded data and coded UCI on the PUSCH.

2. The method of claim 1, wherein a parameter $Q'_{temp}$, which represents the number of coded modulation symbols per layer, is determined based on:

$$Q'_{temp} = \left\lceil \frac{O \cdot M_{sc}^{PUSCH-initial(1)} \cdot N_{symb}^{PUSCH-initial(1)} \cdot M_{sc}^{PUSCH-initial(2)} \cdot N_{sym}^{PUSCH-initial(2)} \cdot \beta_{offset}^{PUSCH}}{\sum_{r=0}^{C^{(1)}-1} K_r^{(1)} \cdot M_{sc}^{PUSCH-initial(2)} \cdot N_{symb}^{PUSCH-initial(2)} + \sum_{r=0}^{C^{(2)}-1} K_r^{(2)} \cdot M_{sc}^{PUSCH-initial(1)} \cdot N_{symb}^{PUSCH-initial(1)}} \right\rceil$$

where $\lceil\ \rceil$ denotes a ceiling function that rounds a number to its next integer, O denotes the number of bits of the UCI, $M_{sc}^{PUSCH-initial(j)}$ denotes scheduled bandwidths for an initial PUSCH transmission for a related TB, $N_{symb}^{PUSCH-initial(j)}$ denotes the number of single-carrier frequency division multiple access symbols per sub-frame in an initial PUSCH transmission for the related TB, $\beta_{offset}^{PUSCH}$ denotes the offset of the PUSCH, C denotes a total number of code blocks of the related TB, $K_r^j$ denotes the number of bits for a code block r in $TB_j$, j denotes a TB, and j=1, 2.

3. The method of claim 2, wherein the number of coded modulation symbols per layer is determined based on:

$$\min(Q_{temp}, 4 \cdot M_{sc}^{PUSCH})$$

where $M_{sc}^{PUSCH}$ denotes scheduled bandwidths for a PUSCH transmission in a current sub-frame for a TB.

4. The method of claim 1, wherein the UCI includes a hybrid automatic repeat request (HARQ)-acknowledgement (ACK) or a rank indicator (RI).

5. The method of claim 1, further comprising determining a number of the coded UCI based on the number of coded modulation symbols per layer and one of the modulation order of the first TB and the modulation order of the second TB.

6. The method of claim 1, wherein the number of coded modulation symbol per layer is determined further based on a number of single-carrier frequency division multiple access symbols of the first TB, scheduled bandwidth for the first TB, a number of single-carrier frequency division multiple access symbols of the second TB, and scheduled bandwidth for the second TB.

7. An apparatus for transmitting uplink control information (UCI), the apparatus comprising:
a coder configured to code data, and to code UCI based on a number of coded modulation symbols per layer;
a controller configured to control to determine the number of coded modulation symbols per layer, when two transport blocks (TBs) are transmitted in a physical uplink shared channel (PUSCH), based on:
one of a modulation order of a first TB and a modulation order of a second TB,
a value related to a number of bits in the first TB comprising at least one code block,
a value related to a number of bits in the second TB comprising at least one code block,
a number of bits of the UCI, and
an offset of the PUSCH; and
a transmitter configured to multiplex the coded data and the coded UCI, and to transmit the multiplexed coded data and coded UCI on the PUSCH.

8. The apparatus of claim 7, wherein a parameter $Q'_{temp}$, which represents the number of coded modulation symbols per layer, is determined based on:

$$Q'_{temp} = \left\lceil \frac{O \cdot M_{sc}^{PUSCH-initial(1)} \cdot N_{symb}^{PUSCH-initial(1)} \cdot M_{sc}^{PUSCH-initial(2)} \cdot N_{sym}^{PUSCH-initial(2)} \cdot \beta_{offset}^{PUSCH}}{\sum_{r=0}^{C^{(1)}-1} K_r^{(1)} \cdot M_{sc}^{PUSCH-initial(2)} \cdot N_{symb}^{PUSCH-initial(2)} + \sum_{r=0}^{C^{(2)}-1} K_r^{(2)} \cdot M_{sc}^{PUSCH-initial(1)} \cdot N_{symb}^{PUSCH-initial(1)}} \right\rceil$$

where $\lceil\ \rceil$ denotes a ceiling function that rounds a number to its next integer, O denotes the number of bits of the UCI, $M_{sc}^{PUSCH-initial(j)}$ denotes scheduled bandwidths for an initial PUSCH transmission for a related TB, $N_{symb}^{PUSCH-initial(j)}$ denotes the number of single-carrier frequency division multiple access symbols per sub-frame in an initial PUSCH transmission for the related TB, $\beta_{offset}^{PUSCH}$ denotes the offset of the PUSCH, C denotes a total number of code blocks of the related TB, $K_r^j$ denotes the number of bits for a code block r in $TB_j$, j denotes a TB, and j=1, 2.

9. The apparatus of claim 8, wherein the number of coded modulation symbols per layer is determined based on:

$$\min(Q'_{temp}, 4 \cdot M_{sc}^{PUSCH})$$

where $M_{sc}^{PUSCH}$ denotes scheduled bandwidths for a PUSCH transmission in a current sub-frame for a TB.

10. The apparatus of claim 7, wherein the UCI includes a hybrid automatic repeat request (HARQ)-acknowledgement (ACK) or a rank indicator (RI).

11. The apparatus of claim 7, wherein the controller is further configured to determine a number of the coded UCI on the number of coded modulation symbols per layer and one of the modulation order of the first TB and the modulation order of the second TB.

12. The apparatus of claim 7, wherein the number of coded modulation symbol per layer is determined further based on a number of single-carrier frequency division multiple access symbols of the first TB, scheduled bandwidth for the first TB, a number of single-carrier frequency division multiple access symbols of the second TB, and scheduled bandwidth for the second TB.

13. A method for receiving uplink control information (UCI), the method comprising:
receiving a signal;
generating data and UCI based on de-multiplexing the received signal;
decoding the data;
when two transport blocks (TBs) are transmitted in a physical uplink shared channel (PUSCH), determining a number of coded modulation symbols per layer based on:
one of a modulation order of a first TB and a modulation order of a second TB,
a value related to a number of bits in the first TB comprising at least one code block,
a value related to a number of bits in the second TB comprising at least one code block,
a number of bits of the UCI, and
an offset of the PUSCH; and
decoding the UCI based on the determined number of coded modulation symbols per layer.

14. The method of claim 13, wherein a parameter $Q'_{temp}$, which represents the number of coded modulation symbols per layer, is determined based on:

$$Q'_{temp} = \left\lceil \frac{O \cdot M_{sc}^{PUSCH-initial(1)} \cdot N_{symb}^{PUSCH-initial(1)} \cdot M_{sc}^{PUSCH-initial(2)} \cdot N_{sym}^{PUSCH-initial(2)} \cdot \beta_{offset}^{PUSCH}}{\sum_{r=0}^{C^{(1)}-1} K_r^{(1)} \cdot M_{sc}^{PUSCH-initial(2)} \cdot N_{symb}^{PUSCH-initial(2)} + \sum_{r=0}^{C^{(2)}-1} K_r^{(2)} \cdot M_{sc}^{PUSCH-initial(1)} \cdot N_{symb}^{PUSCH-initial(1)}} \right\rceil$$

where ⌈ ⌉ denotes a ceiling function that rounds a number to its next integer, O denotes the number of bits of the UCI, $M_{sc}^{PUSCH-initial(j)}$ denotes scheduled bandwidths for an initial PUSCH transmission for a related TB, $N_{symb}^{PUSCH-initial(j)}$ denotes the number of single-carrier frequency division multiple access symbols per sub-frame in an initial PUSCH transmission for the related TB, $\beta_{offset}^{PUSCH}$ denotes the offset of the PUSCH, C denotes a total number of code blocks of the related TB, $K_r^j$ denotes the number of bits for a code block r in $TB_j$, j denotes a TB, and j=1, 2.

15. The method of claim 14, wherein the number of coded modulation symbols per layer is determined based on:

$$\min(Q'_{temp}, 4 \cdot M_{sc}^{PUSCH})$$

where $M_{sc}^{PUSCH}$ denotes scheduled bandwidths for a PUSCH transmission in a current sub-frame for a TB.

16. The method of claim 13, wherein the UCI includes a hybrid automatic repeat request (HARQ)-acknowledgement (ACK) or a rank indicator (RI).

17. The method of claim 13, further comprising determining a number of the coded UCI based on the number of coded modulation symbols per layer and one of the modulation order of the first TB and the modulation order of the second TB.

18. The method of claim 13, wherein the number of coded modulation symbol per layer is determined further based on a number of single-carrier frequency division multiple access symbols of the first TB, scheduled bandwidth for the first TB, a number of single-carrier frequency division multiple access symbols of the second TB, and scheduled bandwidth for the second TB.

19. An apparatus for receiving uplink control information (UCI), the apparatus comprising:
 a receiver configured to receive a signal and to generate data and UCI based on de-multiplexing the received signal;
 a decoder configured to decode the data, and to decode the UCI based on a number of coded modulation symbols per layer; and
 a controller configured to control to determine the number of coded modulation symbols per layer, when two transport blocks (TBs) are transmitted in a physical uplink shared channel (PUSCH), based on:
  one of a modulation order of a first TB and a modulation order of a second TB,
  a value related to a number of bits in the first TB comprising at least one code block,
  a value related to a number of bits in the second TB comprising at least one code block,
  a number of bits of the UCI, and
  an offset of the PUSCH.

20. The apparatus of claim 19, wherein a parameter $Q'_{temp}$, which represents the number of coded modulation symbols per layer, is determined based on:

$$Q'_{temp} = \left\lceil \frac{O \cdot M_{sc}^{PUSCH-initial(1)} \cdot N_{symb}^{PUSCH-initial(1)} \cdot M_{sc}^{PUSCH-initial(2)} \cdot N_{sym}^{PUSCH-initial(2)} \cdot \beta_{offset}^{PUSCH}}{\sum_{r=0}^{C^{(1)}-1} K_r^{(1)} \cdot M_{sc}^{PUSCH-initial(2)} \cdot N_{symb}^{PUSCH-initial(2)} + \sum_{r=0}^{C^{(2)}-1} K_r^{(2)} \cdot M_{sc}^{PUSCH-initial(1)} \cdot N_{symb}^{PUSCH-initial(1)}} \right\rceil$$

where ⌈ ⌉ denotes a ceiling function that rounds a number to its next integer, O denotes the number of bits of the UCI, $M_{sc}^{PUSCH-initial(j)}$ denotes scheduled bandwidths for an initial PUSCH transmission for a related TB, $N_{symb}^{PUSCH-initial(j)}$ denotes the number of single-carrier frequency division multiple access symbols per sub-frame in an initial PUSCH transmission for the related TB, $\beta_{offset}^{PUSCH}$ denotes the offset of the PUSCH, C denotes a total number of code blocks of the related TB, $K_r^j$ denotes the number of bits for a code block r in $TB_j$, j denotes a TB, and j=1, 2.

21. The apparatus of claim 20, wherein the number of coded modulation symbols per layer is determined based on:

$$\min(Q'_{temp}, 4 \cdot M_{sc}^{PUSCH})$$

where $M_{sc}^{PUSCH}$ denotes scheduled bandwidths for a PUSCH transmission in a current sub-frame for a TB.

22. The apparatus of claim 19, wherein the UCI includes a hybrid automatic repeat request (HARQ)-acknowledgement (ACK) or a rank indicator (RI).

23. The apparatus of claim 19, wherein the controller is further configured to determine a number of the coded UCI is determined based on the number of coded modulation symbols per layer and one of the modulation order of the first TB and the modulation order of the second TB.

24. The apparatus of claim 19, wherein the number of coded modulation symbol per layer is determined further based on a number of single-carrier frequency division multiple access symbols of the first TB, scheduled bandwidth for the first TB, a number of single-carrier frequency division multiple access symbols of the second TB, and scheduled bandwidth for the second TB.

* * * * *